(12) United States Patent
Satoda

(10) Patent No.: US 8,161,518 B2
(45) Date of Patent: Apr. 17, 2012

(54) CONTENTS DISTRIBUTION SYSTEM AND DISTRIBUTION SERVER AND DISPLAY TERMINAL OF CONTENTS DISTRIBUTION SYSTEM

(75) Inventor: Kozo Satoda, Tokyo (JP)

(73) Assignee: NEC Corporation, Tokyo (JP)

( * ) Notice: Subject to any disclaimer, the term of this patent is extended or adjusted under 35 U.S.C. 154(b) by 1675 days.

(21) Appl. No.: 10/315,184

(22) Filed: Dec. 10, 2002

(65) Prior Publication Data

US 2003/0110515 A1 Jun. 12, 2003

(30) Foreign Application Priority Data

Dec. 11, 2001 (JP) ................................. 2001-376701

(51) Int. Cl.
*H04N 7/16* (2011.01)
(52) U.S. Cl. ........................................ 725/135; 725/143
(58) Field of Classification Search .................. 725/135, 725/143
See application file for complete search history.

(56) References Cited

U.S. PATENT DOCUMENTS

| | | | | |
|---|---|---|---|---|
| 5,361,309 A * | 11/1994 | Sugiyama | ...................... | 382/177 |
| 5,805,153 A * | 9/1998 | Nielsen | ............................ | 725/37 |
| 5,978,036 A * | 11/1999 | Higa et al. | .................... | 348/468 |
| 6,188,429 B1 * | 2/2001 | Martin et al. | .............. | 348/14.08 |
| 6,492,994 B2 * | 12/2002 | Yokouchi | ....................... | 345/619 |
| 6,701,008 B1 * | 3/2004 | Suino | ............................. | 382/164 |
| 6,903,779 B2 * | 6/2005 | Dyer | ............................. | 348/465 |
| 2007/0044010 A1 * | 2/2007 | Sull et al. | .................... | 715/500.1 |

FOREIGN PATENT DOCUMENTS

| | | |
|---|---|---|
| GB | 2 244 886 | 12/1991 |
| JP | 2000-324416 | 11/2000 |
| JP | 2000-324416 A | 11/2000 |

OTHER PUBLICATIONS

H. Okada et al., "Proposal of a PC Remote Control System by Mobile Devices," Journals of Information Processing Society of Japan, vol. 2001:38, May 11, 2001, pp. 1-6.
A. Nagao, "Convert Contents As You Wish in Accordance With a Device of Your Choice," Nikkei Electronics, No. 770, May 22, 2000, pp. 165-176.

* cited by examiner

*Primary Examiner* — Pankaj Kumar
*Assistant Examiner* — Franklin Andramuno
(74) *Attorney, Agent, or Firm* — Foley & Lardner LLP

(57) ABSTRACT

In a contents distribution system for distributing contents from a distribution server to a display terminal through a transmission path, the distribution server detects a region in which a character is displayed from an image of video contents, generates an image of a high resolution of the detected region as character information for use in confirming a character displayed in the detected region and text data obtained by character read and distributes the generated character information with the video contents multiplexed to the display terminal, and the display terminal presents the character information received from the distribution server.

23 Claims, 12 Drawing Sheets

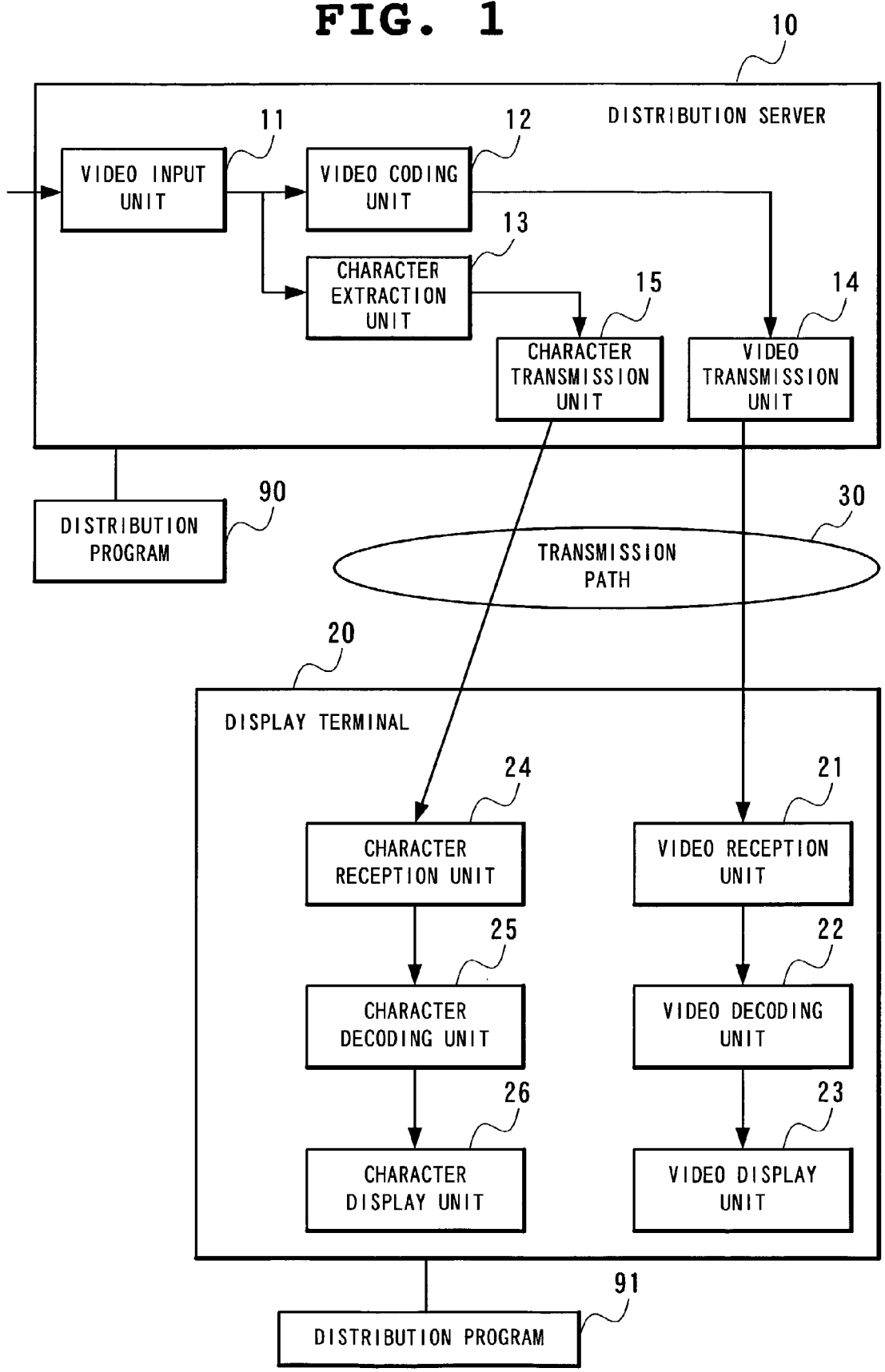

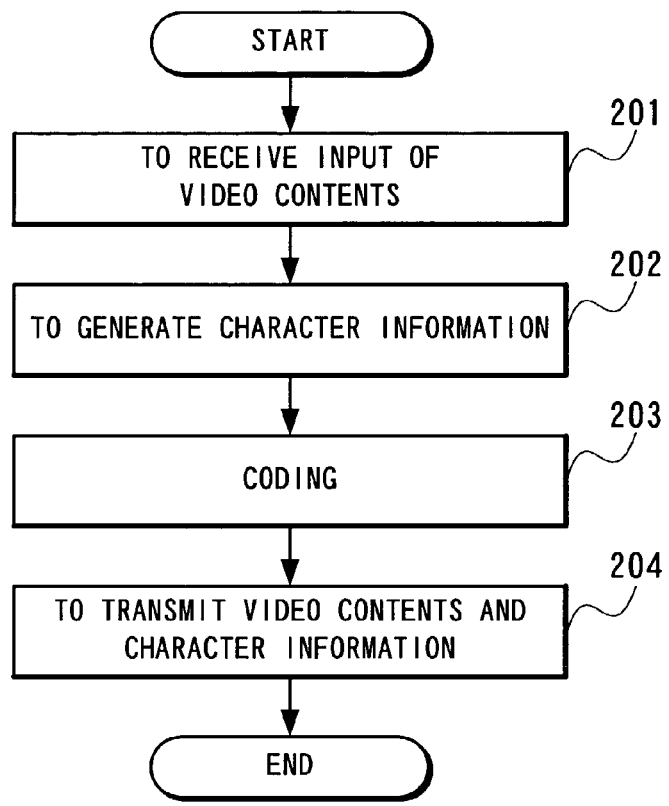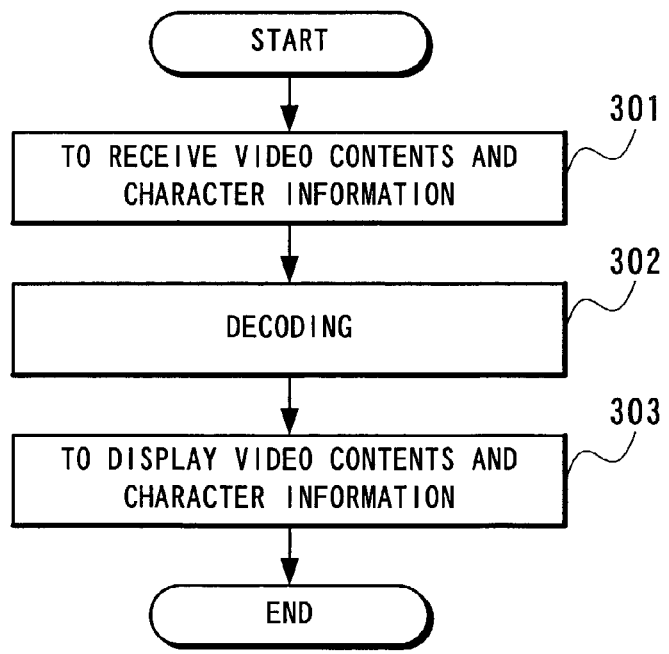

CONTENTS DISTRIBUTION SYSTEM AND DISTRIBUTION SERVER AND DISPLAY TERMINAL OF CONTENTS DISTRIBUTION SYSTEM

BACKGROUND OF THE INVENTION

1. Field of the Invention

The present invention relates to a system for distributing video contents from a distribution server to a user's display terminal through a transmission path and, more particularly, to a contents distribution system for distributing contents to such a display terminal whose display unit is small as a portable communication terminal, a distribution server and a display terminal thereof, and a contents distribution program.

2. Description of the Related Art

FIG. 13 is a block diagram showing a structure of a conventional video distribution system, in which a video distribution server 60 for distributing video distributes video contents through a transmission path 30 and a user's video display terminal 70 receives and presents the video contents.

Japanese Patent Laying-Open (Kokai) No. 2000-32441 proposes a technique of extracting telop information from television broadcasting received by a television receiver and transmitting and displaying the information to and on a still picture display terminal such as a remote-controlled terminal, thereby exhibiting character information to have high quality.

Since telop information often contains such important information for understanding stories and contents at the time of viewing and listening to video as telop in a news program and telop information including superimposition of a movie, it is effective to present the information to users by using high-quality images easy to read.

Although not included in the above-described conventional techniques, extraction of not only telop information but also other character information than telop is useful which exists in common scenes such as a product name written on a product shown in a commercial film, characters on a signboard and a mark in the background of a drama.

Although the above-described conventional art disclosed in Japanese Patent Laying-Open (Kokai) No. 2000-324416 targets common television broadcasting, the recent speed-up of the Internet, speed-up of radio communication in particular, enables users to view accumulated video clips such as film advertisement and music promotion video through a PC at home or a mobile phone used outdoors. Distribution of live video is also conducted by distributing video taken by a camera called Web camera which is disposed at a sightseeing spot or on a road through the Internet.

Although distributing such video without modification needs a communication path of an extremely wide band, image compression and coding techniques enable reduction of the amount of information. With the Internet whose band is approximately 64 kbps, for example, viewing video can be realized by distributing compressed video and decoding the same by a terminal having received it.

For transmitting video at a bit rate as low as 64 kbps, however, video is coded with its resolution reduced or its quality degraded and then transmitted to a portable terminal or a PC at home. Thus reducing the resolution or degrading image quality results in making character information contained in the video unclear to be extremely hard to read.

As described above, character information includes information crucial for video viewing, so that when the character information becomes hard to read, it might hinder video viewing.

As described in the foregoing, the conventional art has the following problems.

There have conventionally existed no technique of, at the time of distributing video contents at a low bit rate, extracting character information including telop information, coding the information to have high quality, distributing the coded information and having a user's terminal display the same. The conventional art disclosed in Japanese Patent Laying-Open (Kokai) No. 2000-324416, for example, extracts telop from common television broadcasting received, while it fails to extract telop from video contents reproduced by a portable communication terminal or the like and distributed at a low bit rate because characters are distributed being unclear.

SUMMARY OF THE INVENTION

An object of the present invention is to eliminate the shortcomings of the above-described conventional techniques and provide a contents distribution system in which a reception side display terminal is capable of clearly displaying characters of video contents distributed at a low bit rate, a distribution server and a display terminal thereof, and a contents distribution program.

According to the first aspect of the invention, a contents distribution system for distributing contents from a distribution server to a display terminal, wherein
the distribution server detects a region in which a character is displayed from an image of video contents, generates character information for use in confirming the character displayed in the region detected and distributes the character information generated to the display terminal.

In the preferred construction, the distribution server generates an image of the region detected as the character information of the video contents.

In another preferred construction, the distribution server generates text data of the character displayed in the region detected as the character information of the video contents by character read.

In another preferred construction, when a plurality of regions in which characters are displayed are detected from the image of the video contents, the distribution server accepts designation of the region from the display terminal and distributes the character information generated from the region designated to the display terminal.

In another preferred construction, the distribution server distributes the video contents to the display terminal simultaneously with the character information of the video contents, and the display terminal presents the character information of the video contents received from the distribution server together with the video contents received simultaneously.

In another preferred construction, the distribution server multiplexes the character information of the video contents and the video contents and distributes the multiplexed contents to the display terminal.

In another preferred construction, the display terminal receives, from the distribution server, character information of the video contents received from an external broadcasting station and presents the character information of the video contents together with the video contents.

In another preferred construction, the character information of the video contents includes character subsidiary information indicative of features of the character displayed in the image of the video contents, and the display terminal presents the character information of the video contents received from the distribution server based on the character subsidiary information included in the character information.

In another preferred construction, the character subsidiary information of the video contents includes information about a position, in the image of the video contents, of the region detected from the image.

In another preferred construction, the character subsidiary information of the video contents includes information about a layout structure of the character displayed in the image of the video contents.

According to the second aspect of the invention, a distribution server for distributing contents to a display terminal, comprises
- means for detecting a region in which a character is displayed from an image of video contents,
- means for generating character information for use in confirming the character displayed in the region detected, and
- means for distributing the character information generated to the display terminal.

In the preferred construction, the server may further comprise means for, when a plurality of regions in which characters are displayed are detected from the image of the video contents, accepting designation of the region from the display terminal,
- thereby distributing the character information generated in the region designated to the display terminal.

In another preferred construction, the server may further comprise means for distributing the video contents to the display terminal simultaneously with the character information of the video contents.

In another preferred construction, the server may further comprise means for multiplexing the character information of the video contents and the video contents and distributing the multiplexed contents to the display terminal.

In another preferred construction, the server may further comprise means for generating an image of the region detected as the character information of the video contents, and means for reducing the size of an image of the video contents to be distributed to the display terminal to a designated size,
- thereby distributing the image generated as the character information with quality higher than the quality of the video contents whose image size is reduced to the display terminal together with the video contents reduced.

In another preferred construction, the server may further comprise means for generating an image of the region detected as the character information of the video contents.

In another preferred construction, the server may further comprise means for generating an image obtained by making the region detected into a binary image as the character information of the video contents.

In another preferred construction, the server may further comprise means for generating text data of the character displayed in the region detected as the character information of the video contents by character read.

In another preferred construction, the server may further comprise means for obtaining text data of the character displayed in the region detected by character read, and means for generating a translation which is obtained by translating the text data obtained by the character read into a designated language as the character information of the video contents.

In another preferred construction, the server may further comprise means for identifying features of a character displayed in the image of the video contents,
- thereby distributing, as character subsidiary information, information about features of the character identified so as to be included in the character information of the video contents to the display terminal.

In another preferred construction, the server may further comprise means for recording the video contents and the character information of the video contents, and means responsive to a request from the display terminal for distributing the video contents and the character information of the video contents requested to the display terminal.

According to the third aspect of the invention, a display terminal for presenting contents distributed from a distribution server, comprises
- means for receiving character information for use in confirming a character displayed in an image of video contents from the distribution server, and
- means for presenting the character information received.

In the preferred construction, the display terminal may further comprise means for accepting, from the distribution server, a notification that a plurality of regions in which characters are displayed are detected from the image of the video contents, and means for notifying the region selected by a user from among the plurality of regions detected to the distribution server,
- thereby receiving the character information for use in confirming a character displayed in the region selected from the distribution server.

In another preferred construction, the character information of the video contents is an image of a region in which a character is displayed in the image of the video contents.

In another preferred construction, the display terminal may further comprise means for obtaining, from the image of the character information by character read, text data of a character indicated in the character information received and presenting the obtained data.

In another preferred construction, the character information of the video contents is text data of a character displayed in the image of the video contents.

In another preferred construction, the display terminal may further comprise means for simultaneously receiving the character information of the video contents and the video contents in question from the distribution server, and means for presenting both the character information and the video contents received.

In another preferred construction, the display terminal may further comprise means for receiving the character information of the video contents and the video content in question which are multiplexed and distributed from the distribution server.

In another preferred construction, the display terminal may further comprise means for receiving, from the distribution server, the character information of the video contents received from an external broadcasting station and presenting the character information of the video contents together with the video contents.

In another preferred construction, the character information of the video contents includes character subsidiary information indicative of features of the character displayed in the image of the video contents, and which further comprises means for presenting the character information of the video contents received from the distribution server based on the character subsidiary information included in the character information.

In another preferred construction, the character subsidiary information includes information about a position, in the image of the video contents, of a region in which a character in the image is displayed, and which further comprises means for presenting the video contents with the region where the character is displayed which is indicated in the character subsidiary information erased.

In another preferred construction, the display terminal may further comprise means for instructing the distribution server to transmit or not to transmit the character information.

According to another aspect of the invention, a display terminal for presenting video contents, comprises means for detecting a region in which a character is displayed from an image of video contents, means for generating character information for use in confirming the character displayed in the region detected, and means for presenting the character information generated.

In the preferred construction, the display terminal further comprises means for presenting the character information of the video contents in question together with the video contents.

In another preferred construction, the display terminal further comprises means for simultaneously displaying the character information of the video contents and the video contents in separate windows on a display screen.

In another preferred construction, the display terminal further comprises means for simultaneously displaying, in an area in which the video contents are displayed on the display screen, character information of the video contents.

In another preferred construction, the display terminal is a portable communication terminal.

According to another aspect of the invention, a contents distribution program for distributing contents to a display terminal by controlling a computer, comprising the functions of detecting a region in which a character is displayed from an image of video contents,
generating character information for use in confirming the character displayed in the region detected, and
distributing the character information generated to the display terminal together with the video contents.

According to a further aspect of the invention, a contents distribution program for presenting contents distributed from a distribution server by controlling a computer, comprising the functions of receiving character information for use in confirming a character displayed in an image of video contents from the distribution server together with the video contents, and
presenting the character information received together with the video contents received.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing a structure of a contents distribution system according to a first embodiment of the present invention;

FIG. 2 is a flow chart for use in explaining operation of a distribution server of the first embodiment of the present invention;

FIG. 3 is a flow chart for use in explaining operation of a display terminal of the first embodiment of the present invention;

DESCRIPTION OF THE PREFERRED EMBODIMENT

Figure 4:
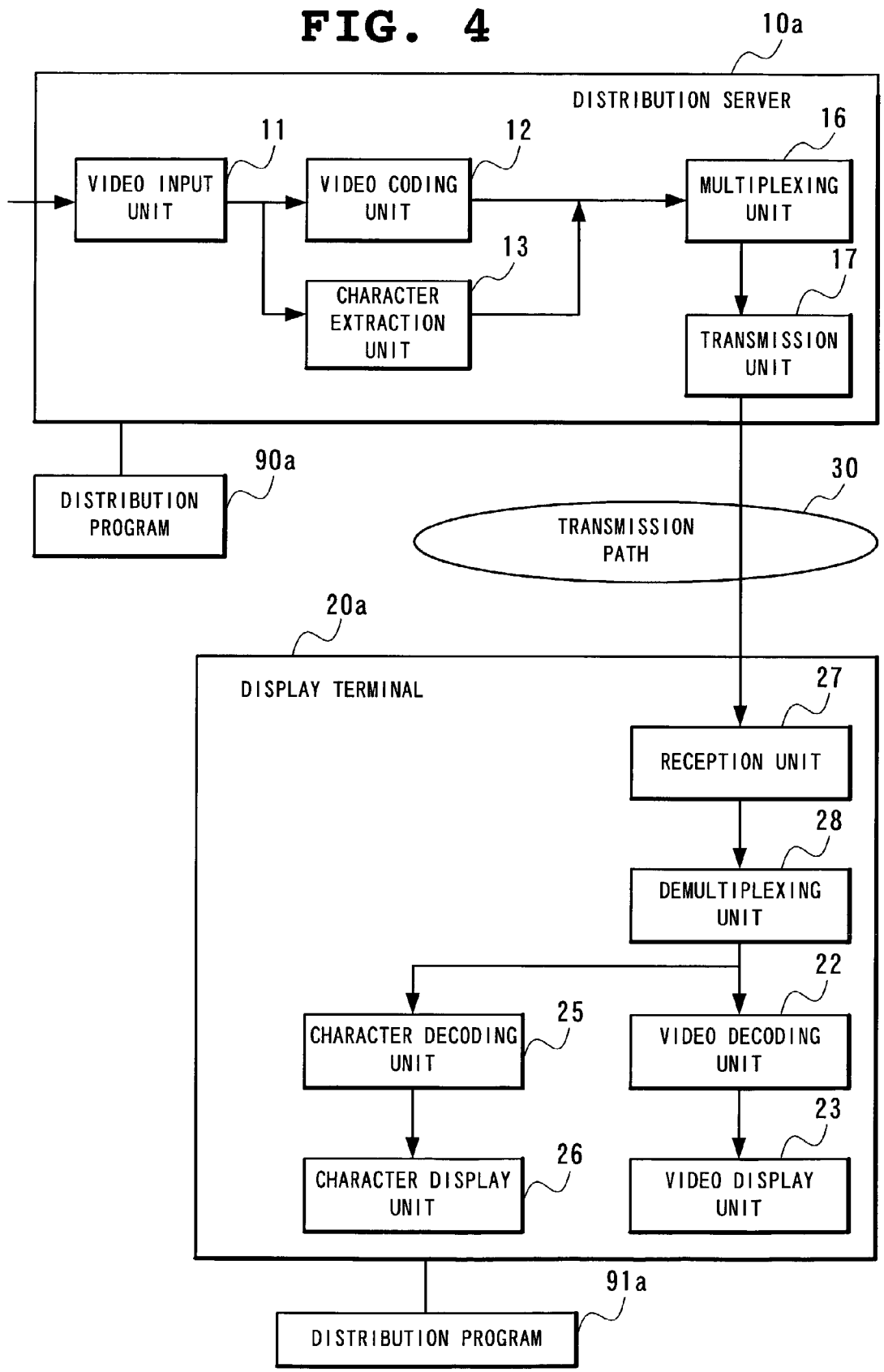
FIG. 4 is a block diagram showing a structure of a contents distribution system according to a second embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

FIG. 1 is a block diagram showing a structure of a contents distribution system according to a first embodiment of the present invention, which also shows a structure of a distribution server 10 and a display terminal 20 of the present embodiment.

With reference to FIG. 1, the distribution server 10 of the present embodiment, which is realized by a program-controlled CPU or the like, includes a video input unit 11, a video coding unit 12, a character extraction unit 13, a video transmission unit 14 and a character transmission unit 15. The display terminal 20 of the present embodiment, which is realized by a program-controlled CPU or the like, includes a video reception unit 21, a video decoding unit 22, a video display unit 23, a character reception unit 24, a character decoding unit 25 and a character display unit 26.

Video contents targeted by the distribution server 10 may be live contents of television broadcasting and the like or video contents which are already coded and accumulated such as movie preview video.

Although no specific limitation is set on a transmission path 30 connecting the distribution server 10 and the display terminal 20, description will be made here as an example assuming that a general radio line for a mobile phone, a PHS or the like, or a general telephone line for an ISDN or the like is used to have a bit rate of 64 kbps to 384 kbps.

FIG. 2 is a flow chart for use in explaining operation of the distribution server 10 according to the present embodiment, while FIG. 3 is a flow chart for use in explaining operation of the display terminal 20 according to the present embodiment.

In the distribution server 10 of the present embodiment, the video input unit 11 receives input of video contents (Step 201), and the character extraction unit 13 detects a region in which a character is displayed (character region) from the video contents to generate character information for use in confirming the character (Step 202). Then, the video contents are coded by the video coding unit 12 (Step 203), the coded video contents are transmitted by the video transmission unit 14 to the display terminal 20 and at the same time, the character transmission unit 15 transmits the character information to the display terminal 20 (Step 204).

By means of the video reception unit 21, the display terminal 20 receives the video information (video contents) which is transmitted from the transmission server 10 and receives the character information by means of the character reception unit 24 (Step 301). Then, decode the video contents by the video decoding unit 22 and decode the character information by the character decoding unit 25 (Step 302). Then, display the video contents by the video display unit 23 and display the character information by the character display unit 26 to present them to a user (Step 303). As a result the user of the display terminal 20 is allowed to view the video information and the character information.

Although in the present embodiment, as a transmission path for transmitting video contents and character information from the distribution server 10 to the display terminal 20, the common transmission path 30 is used, the transmission path is not necessarily limited to the common transmission path 30. Other than the system of transmitting video contents and character information using packet switching of the same mobile phone, possible is, for example, a system of transmitting only character information by using packet switching of a mobile phone and video contents by using circuit switching of the mobile phone.

Here, when distributing video contents and character information through different transmission paths, such a mode of use can be executed of viewing the video contents by a terminal such as a videophone and receiving the character information through the Internet.

In a case of distributing video information and character information through the common transmission path 30, it is possible to adopt a system of multiplexing the video contents and the character information and distributing the multiplexed contents as will be described in a second embodiment of the present invention.

FIG. 4 is a block diagram showing a structure of a contents distribution system according to a second embodiment of the present invention. According to the present embodiment, a distribution server 10a is provided with a multiplexing unit 16 and a transmission unit 17 in place of the video transmission unit 14 and the character transmission unit 15 of the first embodiment and a display terminal 20a includes a reception unit 27 and a demultiplexing unit 28 in place of the video reception unit 21 and the character reception unit 24 of the first embodiment.

Figure 5:
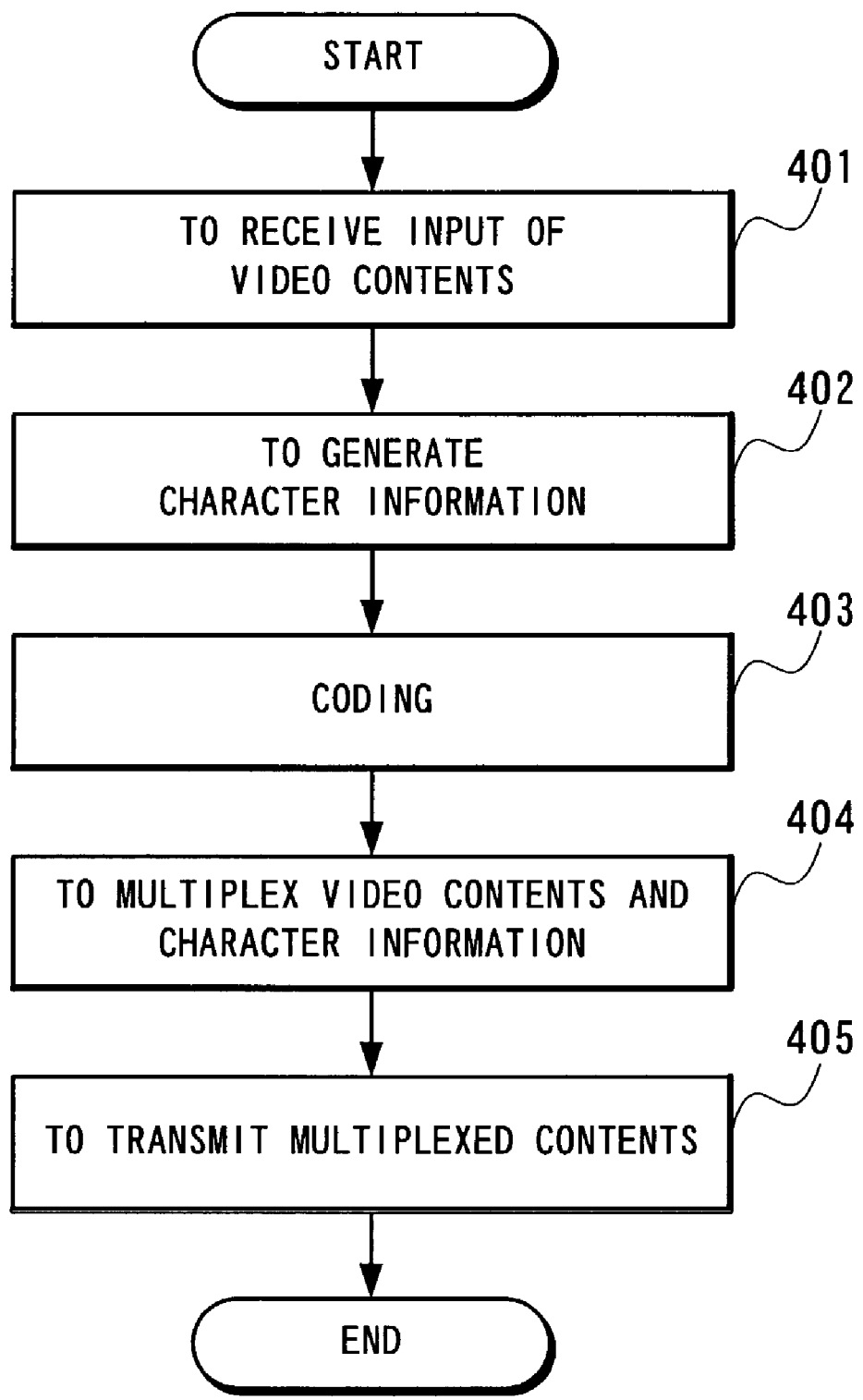
FIG. 5 is a flow chart for use in explaining operation of a distribution server of the second embodiment of the present invention.
Figure 6:
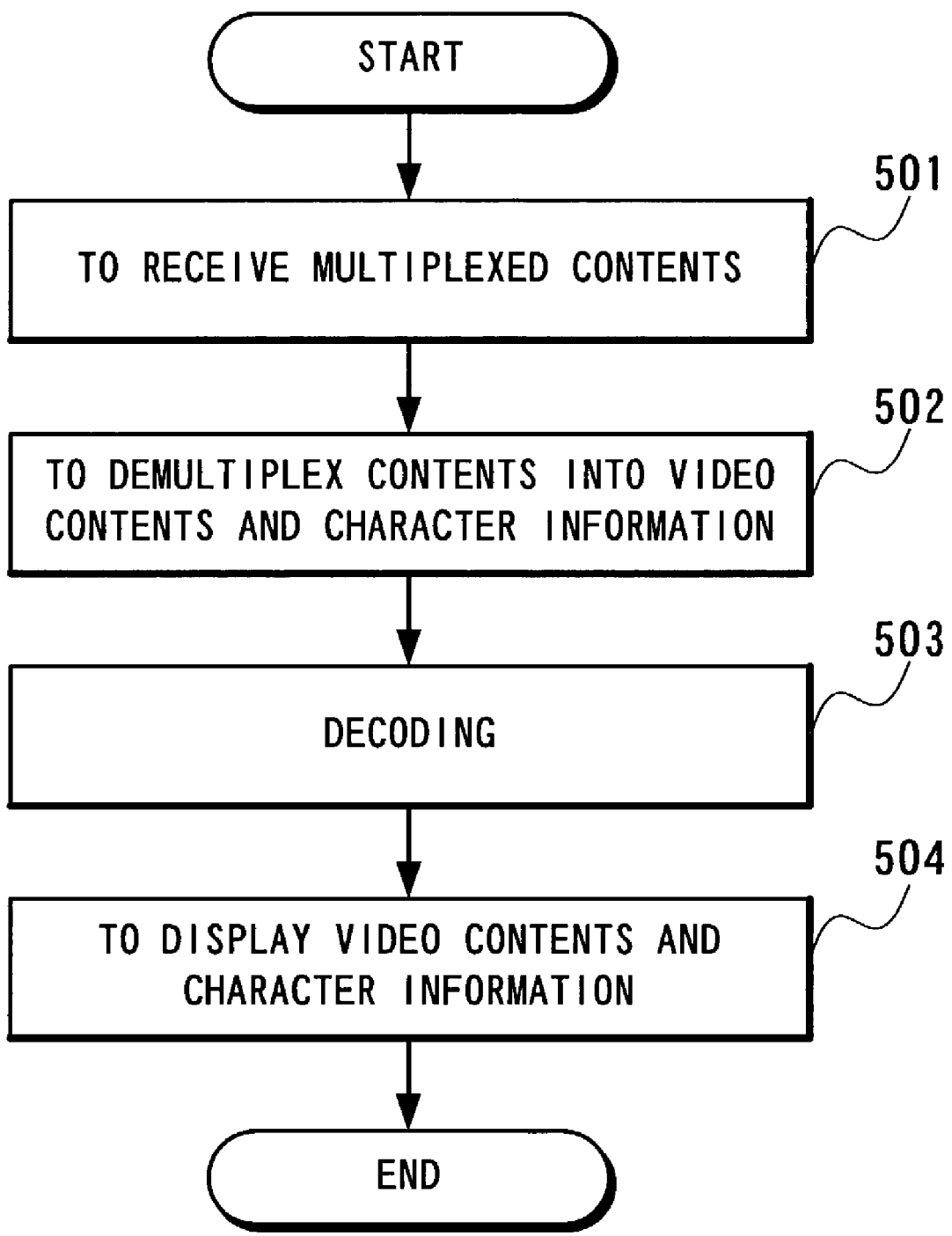
FIG. 6 is a flow chart for use in explaining operation of a display terminal of the second embodiment of the present invention.

FIG. 5 is a flow chart for use in explaining operation of the distribution server 10a of the present embodiment, while FIG. 6 is a flow chart for use in explaining operation of the distribution server 20a of the present embodiment.

With reference to FIGS. 5 and 6, the operation of the present embodiment differs from that of the first embodiment in that, in the distribution server 10a, video contents coded by the video coding unit 12 and character information extracted by the character extraction unit 13 are multiplexed by the multiplexing unit 16 (Step 404) and the multiplexed contents are transmitted to the display terminal 20a by the transmission unit 17 (Step 405). In the display terminal 20a, the multiplexed contents received by the reception unit 27 (Step 501) are demultiplexed by the demultiplexing unit 28 into video contents and character information (Step 502) which will be decoded and displayed (Steps 503 and 504).

As a multiplexing method, it is possible to multiplex information about video and voice and character information by using H.324/M which is a standard for realizing videophone settled by ITU-T.

Although employed here is a system of receiving input of video contents which are read from live video and from accumulated video by the video input unit 11 and distributing the contents, another system can be similarly executed of accumulating processing results obtained by the video coding unit 12 and the character extraction unit 13 and reading the accumulated video contents upon a user's request.

Next, description will be made of a method of distributing character information generated from video contents and the video contents in question by the distribution server 10a and displaying the same by the display terminal 20a with reference to FIG. 7. Description made here is applicable not only to the second embodiment but also to the first embodiment.

Figure 7:
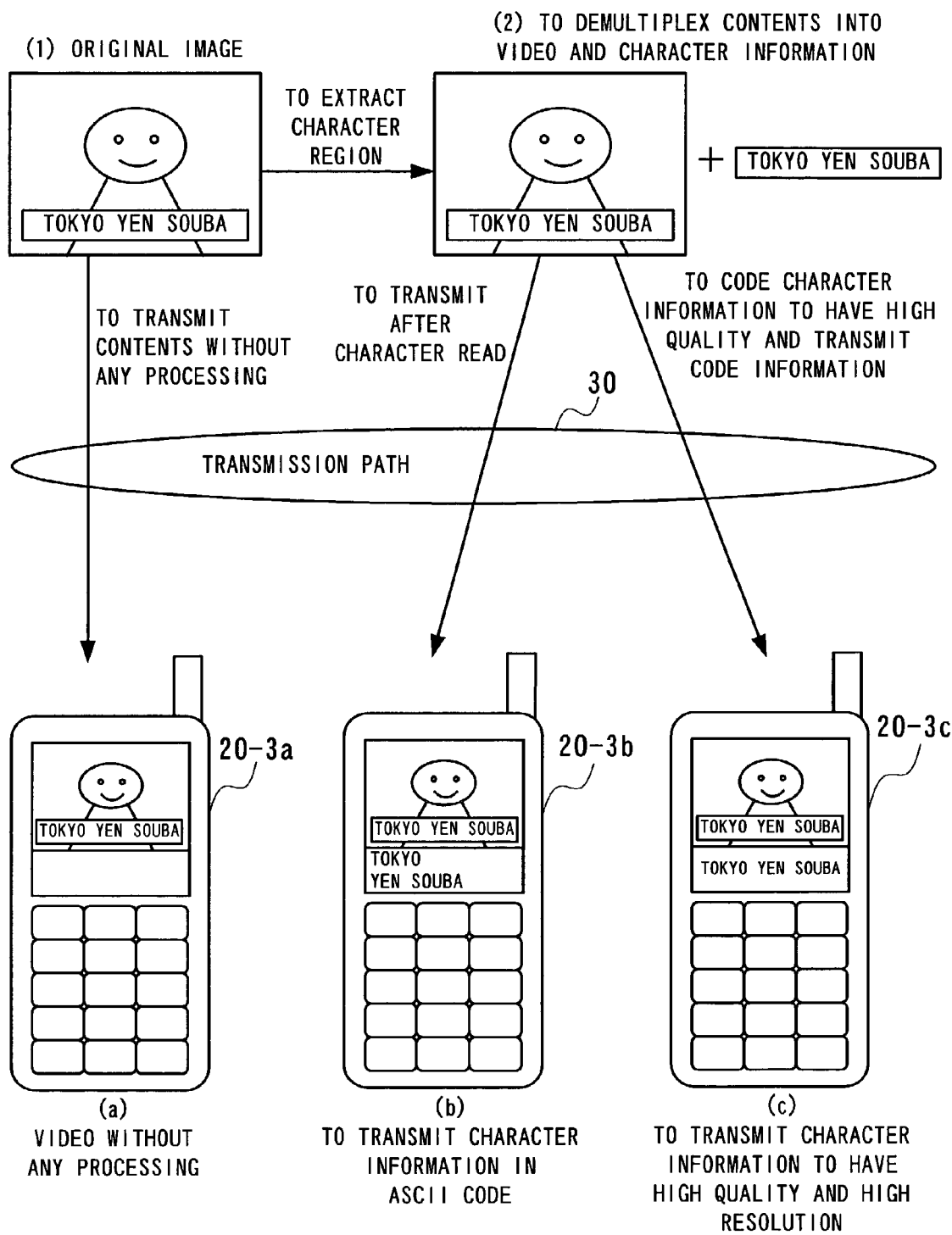
FIG. 7 is a diagram for use in explaining character region extraction according to the second embodiment of the present invention.

Shown in FIG. 7 is a scene where a user views and listens to a news program, in which an original image illustrated in FIG. 7(1) shows a news program with telop indicating a news headline superimposed on video of an announcer.

Although the description will be here made targeting telop information as character information, it can be similarly made targeting a common character which is not telop such as a character on a signboard in a video scene and a character multiplexed with video in data broadcasting or character broadcasting.

A display screen 20-3a in FIG. 7 shows one example of display on the display terminal 20a which is obtained when video is coded and transmitted as it is as in conventional art.

Here, the transmission path 30 is a transmission path having a bit rate as low as 64 kbps to 384 kbps and for transmitting video coded by using such a transmission path 30 having a low bit rate, it is necessary to employ the following coding methods (1) and (2) of:

(1) coding with a resolution of input video reduced, and
(2) degrading an image by reducing a bit rate necessary for coding.

Since in general, telop of news video of television is premised on that it is viewed and listened with a resolution of the television (e.g. 720×480), decreasing the resolution to a resolution as low as that of QCIF (176×144) or CIF (352×288) which is often used in a mobile phone for distributing video will result in having characters become smaller or deformed to make them hard to read.

On the other hand, degrading an image will in general result in decreasing a contrast to make a character unclear. In an MPEG as an ISO standard, for example, since video is divided into blocks to conduct coding on a block basis, degrading an image results in making a boundary between blocks conspicuous and furthermore reducing a contrast in the block. As a result, also in such a part that has to have clear contrast as a telop character, its character becomes hard to read because the contrast is lowered.

Although FIG. 7 shows an image for use in viewing and listening to video using a mobile phone, this problem will occur not only with a mobile phone whose display screen is small but also with any display terminal 20a when video is distributed using the transmission path 30 of a low bit rate.

This problem can be considered to derive from the fact that natural video such as a person and artificial character information are handled simultaneously at the time of coding at a low bit rate. In the first and the second embodiments of the present invention, therefore, the distribution servers 10 and 10a detect a character region in which characters are displayed from an image of video contents, generate information (character information) for use in confirming the displayed characters and distribute the character information together with the video contents to the display terminals 20 and 20a as shown in FIG. 7(2) without transmitting the video contents as they are.

In other words, the video contents will be transmitted being an original image as in a conventional case shown in the display screen 20-3a, while in the present embodiment (and the first embodiment), information (character information) for use in confirming characters in a character region is coded by other method than that of the video contents and then transmitted.

It is for example possible to conduct character read with respect to video of an extracted character region, obtain text data of the displayed characters and transmit each character being indicated as numerical information (character code) such as an ASCII code. A display screen 20-3b shows one example of display on the display terminal 20a when character information is thus separately transmitted.

Transmitting character information as text data (character code) enables reduction of a volume of communication and also enables the information to be displayed to have an arbitrary size on the display terminal 20a, which allows characters to be displayed in a large size to be easy to read.

Processing of the character read can be executed using techniques employed in OCR software currently on the market and the like and other conventional techniques.

When using character reading techniques as described above, because it is often the case that characters are erroneously read in automatic processing of character read, transmitting not text data obtained by character read but by an image of a character region in which characters are displayed as character information is also effective.

In this case, with the entire image having a low resolution, by coding only an extracted character region with a high resolution and transmitting the coded image, characters can be displayed to be easy to read as shown on a display screen 20-3c in FIG. 7. In the display screen 20-3c in FIG. 7, video of the character region having a high resolution is displayed below the entire video contents.

Also, since as to telop information, it is a common practice to have the same telop shown for a few seconds so as to enable viewers to read, by making use of the fact, such control can be provided as transmitting new character information only when the telop information is changed. Although transmitting an image coded with a high resolution as it is will result in costing a capacity of the transmission path 30, thus transmitting video of a character region with its transmission frequency reduced enables its necessary band to be smaller.

In addition, not transmitting a color image of an extracted character region without modification but coding an image converted into a binary image to have reduced colors in which a character is displayed in black and background in white, for example, and transmitting the coded image enables the volume of transmission to be further reduced.

As described in the foregoing, for coding a character region to have a high resolution, an MPEG as a moving image coding system or the like can be used. JPEG or JPEG2000 as a still picture coding system can be also used and for a binary image, such a coding system as JBIG can be used.

The character extraction unit 13 of the present embodiment extracts a character region, for which character region extraction, conventionally executed techniques can be used.

Since telop information, for example, has such characteristics as shown in the following (1) to (3), extraction is possible using such characteristics.

(1) White characters are often used.
(2) Motion is slow.
(3) Characters appear not singly but in a group of a plurality of characters.

In addition, the character extraction unit 13 can conduct not only extraction of a character region and character read of a character region but also extraction of a position of a character region in video and analysis of a document layout structure of a character region, so that it is possible to extract a position of a character region, a layout structure or the like by the character extraction unit 13 and transmit the same by the character transmission unit 15.

Such a position of a character region in video contents and a layout structure of a character region will be referred to as character subsidiary information. Character information is assumed to include character subsidiary information in addition to the above-described image (video) of a character region, text data obtained by character read and the like.

Although the foregoing is the description made of extraction of character information in telop information and a video scene, such processing is unnecessary when characters are multiplexed with video as in data broadcasting, and the character extraction unit 13 may demultiplex character information multiplexed in data broadcasting or the like to extract text data.

Figure 8:
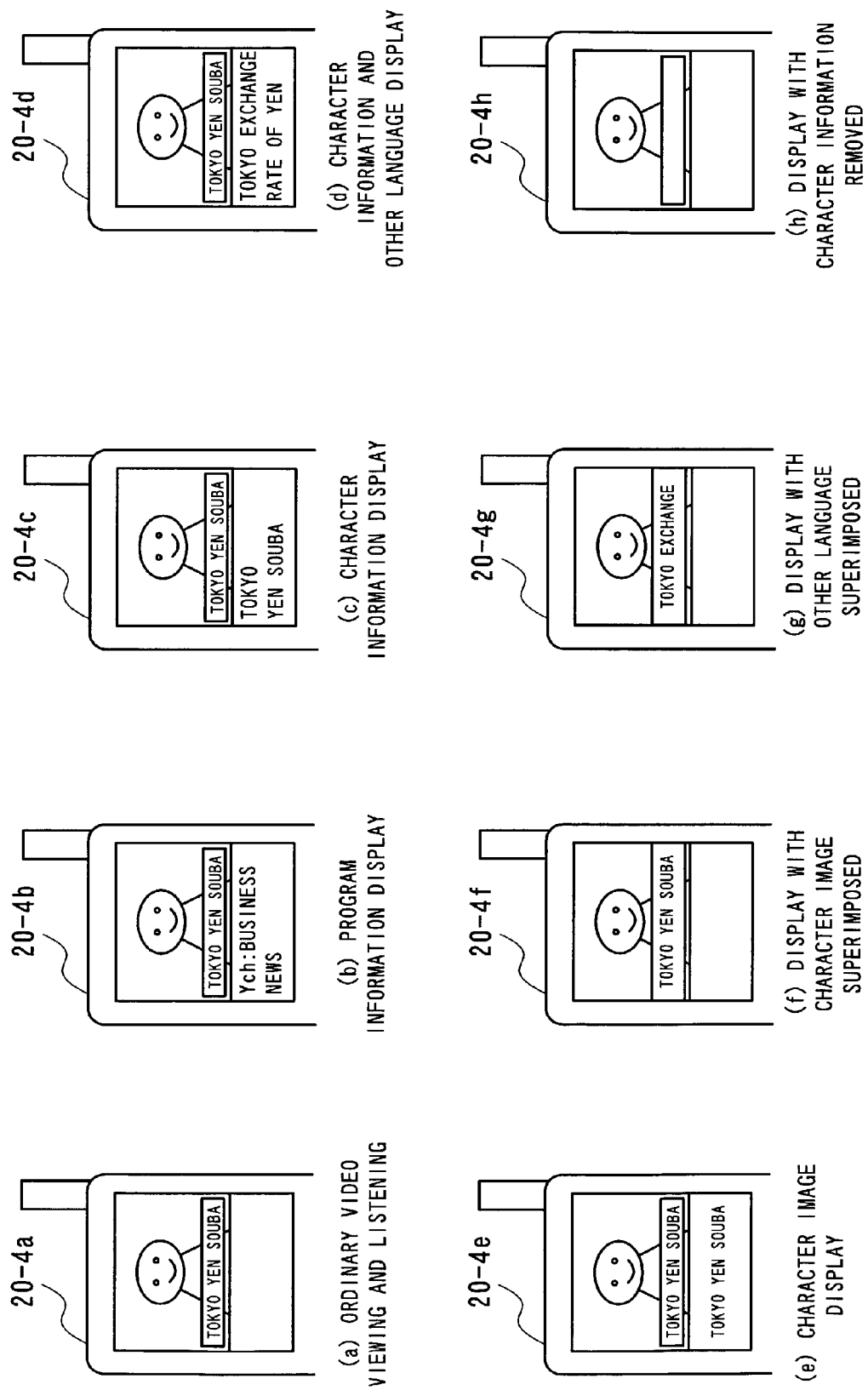
FIG. 8 is a diagram for use in explaining a video display scheme at the display terminal according to the second embodiment of the present invention.

While the description has been made with reference to FIG. 7 that separately transmitting character information and video information enables users to read the character information clearly, FIG. 8 shows a method of presenting character information to users.

A display screen 20-4a in FIG. 8 shows a case where ordinary video is displayed in the same manner as in conventional art without displaying character information etc. At this state, no other information than video contents is presented to a user. There is also a conventional technique of displaying such general information as a channel number and a program name of video being displayed (by using text broadcasting) as shown in a display screen 20-4b to enable a user to know what he or she now views and listens to. The display terminal 20a of the present embodiment ordinarily conducts display as shown in the display screen 20-4a and the display screen 20-4b.

Here, when a user finds character information such as telop unclear, the user receives the character information from the distributions server 10a and has the same displayed independently of video contents.

Although the display terminal 20a can constantly receive character information sent from the distribution server 10a, the present embodiment will be described herewith respect to a method of issuing a character information transmission request to the distribution server 10a only when necessary to receive character information without constantly receiving character information for the purpose of saving a band.

By issuing a request for character information to the distribution server 10a, the display terminal 20a receives distribution of character information in video from the distribution server 10a and displays the character information.

Character information, which is transmitted as text data obtained by character read etc. in one case and transmitted as a high-quality image in another case, may be appropriately used according to a capacity of the distribution server 10a, or selection between transmission of a result of character read and transmission of an image itself may be made as the user issues a request for character information transmission to the distribution server 10*a*.

A display screen 20-4*c* is a display example in a case where received character information is subjected to character read and sent as text data, in which adjacent to video contents, its character information is displayed. When program information or the like is displayed as shown in the display screen 20-4*b*, switchedly displaying the program information and character information allows even a small screen to be efficiently used.

On the display screen 20-4*c*, because the amount of the character information is small, video information and character information are displayed to be arranged like tiles, while when character information is large, characters may be displayed in a vertical direction, a horizontal direction or both directions by scrolling.

It is also possible to arrange the information, not like tiles as shown in the display screen 20-4*c*, but so as to have part of character information overlapping video. Moreover, when a position of character information in video is received as character subsidiary information from the distribution server 10*a*, the character information may be displayed superimposed on a position of the original video as shown in a display screen 20-4*f*.

Next, description will be made of processing to be conducted when the distribution server 10*a* detects a plurality of regions in which characters are displayed in video contents.

In this case, the distribution server 10*a* can distribute all the character information in the detected video contents to the display terminal 20*a* and also can distribute only character information in a region designated by a user.

One embodiment of the operation conducted in this case will be described. The distribution server 10*a* transmits character information so as to include character subsidiary information such as layout information about a character and a sentence in each region and position information of each region detected to the display terminal 20*a*. Then, by the display terminal 20*a*, a user selects a region whose character information is desired by the user using the character subsidiary information and notifies the distribution server 10*a* of the region. Then, the distribution server 10*a* generates character information from the region selected by the user and notified by the display terminal 20*a* and distributes the information to the display terminal 20*a*.

When there is no character subsidiary information, it is for example possible to instruct the distribution server 10*a* by the display terminal 20*a* to switch character information and sequentially switch the information to select information with reference to the contents of each character information.

Thus, not by distributing all the character information to the display terminal 20*a* but based on a request for character information transmission such as an instruction to switch desired character information notified by the display terminal 20*a* or character information to be distributed, the distribution server 10*a* is allowed to distribute only character information required in video contents.

In this case, while the distribution server 10*a* may first distribute character information of a character region first detected out of an image of video contents to the display terminal 20*a* and have the information first displayed on the display terminal 20*a*, it may more preferably determine an order of distribution based on the contents of character information about a position of display in video contents and a result of character read.

Possible method is most preferentially distributing character information of characters which are horizontally written at the center of the lower part of video contents because they are highly probably telop and on the other hand, with characters indicated at an upper left or right corner of video contents within a narrow range, preferentially distributing other character information than that of these characters because they are highly probably an indication of current time and therefore of little importance.

A further method is possible of distributing all character information from the distribution server 10*a* to the display terminal 20*a* and select character information to be displayed on the side of the display terminal 20*a*.

Also as shown in a display screen 20-4*d*, the distribution server 10*a* may automatically translate text data of its read character information into other language designated, distribute the translation as character information to the display terminal 20*a* and have the terminal display the same.

By employing conventional techniques used in translation software or the like, the automatic translation is possible between various languages such as from Japanese to English as shown in the display screen 20-4*d* and from English to Japanese. By thus automatically translating and distributing extracted character information, service of providing video contents in various languages can be simplified. Method of displaying a translation is the same as that of the display screen 20-4*c*.

Next, as shown on a display screen 20-4*e*, also when the distribution server 10*a* distributes character information as an image (video) of a region in which its characters are displayed, the character information can be displayed in other window than that of the video contents similarly to the case of the display screen 20-4*c*.

When an image of character information larger in size than a screen is distributed, the display terminal 20*a* can reduce the image of the character information and display the reduced image or when a user wants to view details, the terminal can expand the image in a vertical direction or a horizontal direction by scrolling to display the details.

When character information includes character subsidiary information such as layout information, the display terminal 20*a* can regenerate an image of a character region so as to be easy to read based on the information and present the regenerated image.

Also when distributing character information as an image, as shown on the display screen 20-4*f*, the image of the character information can be displayed not in other region than that of video contents but in the same region as that of video with the character information superimposed on the video. By displaying character information so as to be superimposed on a character region of original video contents, in particular, image of the character information can be displayed to be easy to read.

Since an image of character information distributed has a higher resolution than that of original video contents in general, it is possible, similarly to the case of the display screen 20-4*e* as described above, to first reduce the image of the distributed character information, superimpose the reduced image on the original video contents and display the overlapped image and when necessary, release the reduction (or change the size to a designated size) and display the restored image while scrolling.

As shown in the display screen 20-4*d*, character information subjected to character read and translated into other language can be displayed in other window than that of video contents, which can be also similarly displayed being superimposed on the video contents as shown in a display screen 20-4g.

This is applicable to superimposition of video contents of a foreign picture and when a user wants to concentrate on a movie, this prevents the user from losing concentration while watching other window. For realizing the application, it is for example possible to directly superimpose character information of a translation to be distributed in text data on video, or generate and display a character image from the text data of the translation according to a size of a character region.

It is further possible not to distribute a result obtained by character read by the distribution server 10a as text data but to generate a character image indicative of characters of the text data and distribute the image as character information to the display terminal 20a. In this case, the display terminal 20a is allowed to display a character clearly simply by displaying images of the received character information so as to overlap with each other.

In a case of such video contents as video for language learning and of foreign films, such is demanded as erasing superimposition displayed in the video contents.

In this case, as shown in a display screen 20-4h, based on position information of a region where characters are displayed in video contents which position is indicated by distributed character subsidiary information, the display terminal 20a can provide a user with character information with the region in question erased.

Also in this case, when such a need occurs of knowing an answer during language study, the display terminal 20a can present character information to a user while displaying, erasing or switching the character information by the manner as described with respect to the display screens 20-4a to 20-4g according to the user's operation.

Although the foregoing methods of presenting video contents and character information according to the first and the second embodiments have been described with respect to a case, as an example, where the display terminals 20 and 20a are portable communication terminals such as mobile phones, the display terminal 20a is not necessarily limited to a mobile phone. While the contents distribution system of the present invention is effective in particular when the display terminals 20 and 20a as distribution destinations have a display unit whose area is small, distribution to other terminals such as a personal computer and a notebook computer is similarly possible.

As described in the foregoing, the contents distribution systems of the first and the second embodiments enable video contents distributed at a low bit rate to be presented to a user with characters clearly displayed by a reception side display terminal.

Figure 9:
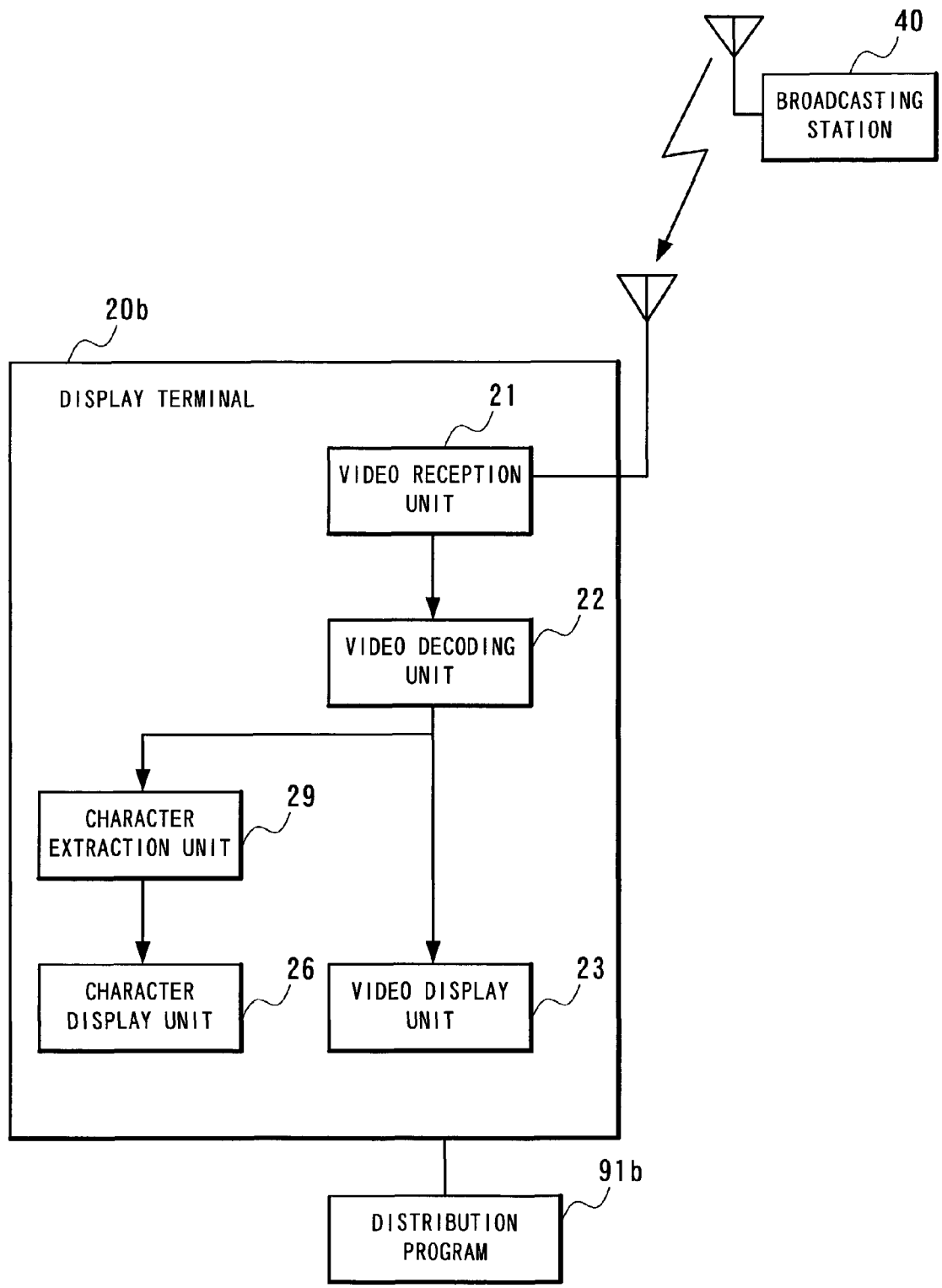
FIG. 9 is a block diagram showing a structure of a contents distribution system according to a third embodiment of the present invention.

Next, a third embodiment of the present invention will be described. FIG. 9 is a block diagram showing a structure of a contents distribution system according to the third embodiment of the present invention. The present embodiment is to extract and display character information only by using a display terminal 20b without using the distribution server 10.

Figure 10:
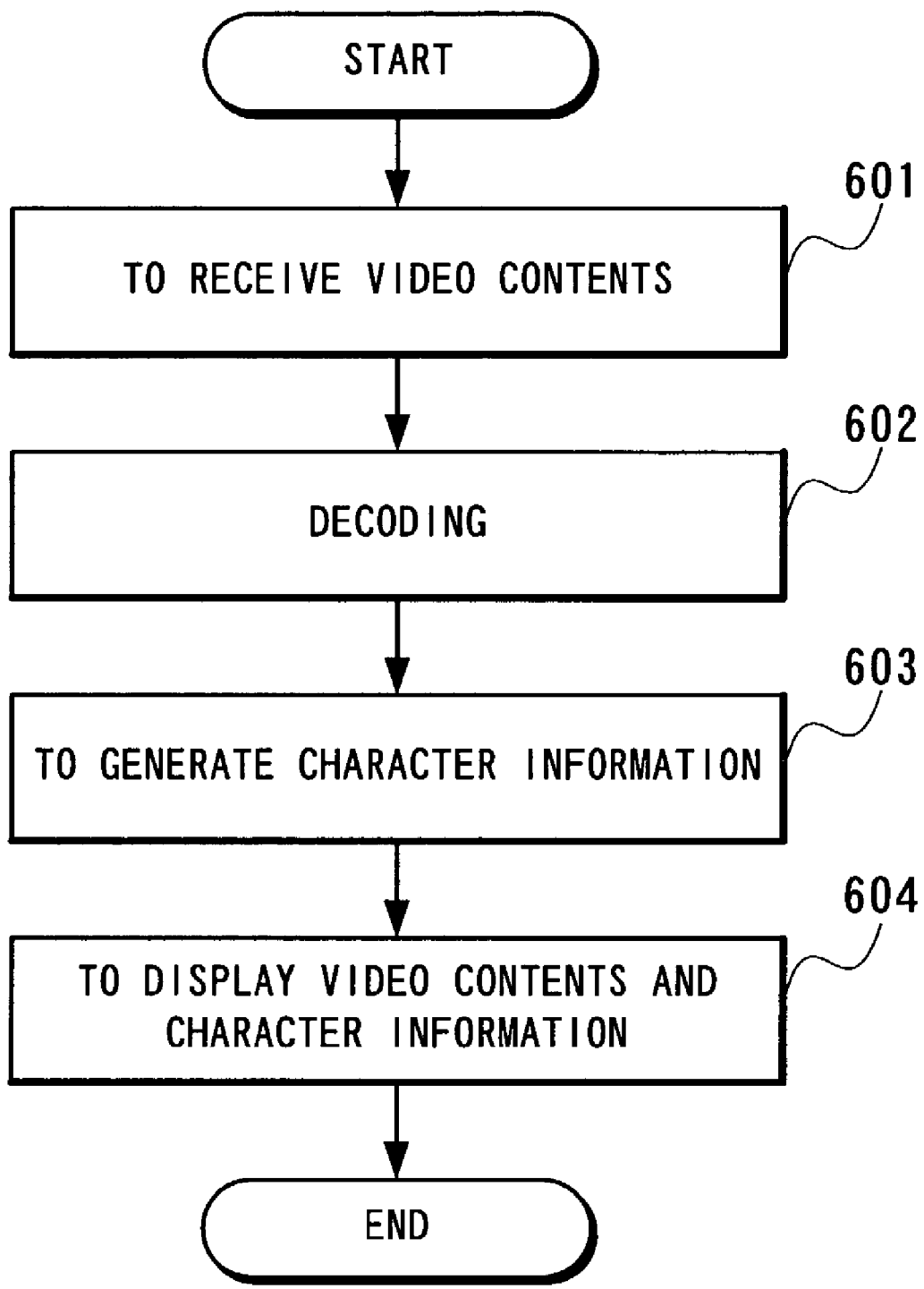
FIG. 10 is a flow chart for use in explaining operation of a display terminal of the third embodiment of the present invention.

FIG. 10 is a flow chart for use in explaining operation of the display terminal 20b according to the present embodiment.

The display terminal 20b of the present embodiment, which is a portable terminal for receiving broadcasting video such as television broadcasting, receives, by means of the video reception unit 21, video contents such as a television program being on air from an external broadcasting station 40 or the like through radio wave (Step 601). Decode the received video contents by means of the video decoding unit 22 (Step 602), generate its character information by means of a character extraction unit 29 (Step 603) and display the video contents and its character information by means of the video display unit 23 (Step 604).

Since the display terminal 20b is premised on portable use, it is only capable of displaying an image with a low resolution, so that the video display unit 23 reduces video contents and displays the reduced contents. At this time, the reduced video contents might have characters of telop or the like be unclear or distorted in some cases.

On the other hand, since video is decoded by the video decoding unit 22 to have a general resolution, by extracting a character region by means of the character extraction unit 29 by using the video with a general resolution and displaying character information by means of the character display unit 26, video contents are presented to a user so as to be easy to understand. In addition, the character extraction unit 29 is capable not only of extracting a character region but also of conducting character read to obtain text data of a character to be displayed. In this case, the obtained text data is displayed by the character display unit 26.

The method of displaying character information conducted by the display terminal 20b according to the present embodiment can be executed by the same manner as those of the above-described first and second embodiments.

As described in the foregoing, according to the present embodiment, when the display terminal 20b has a processing capacity sufficient for conducting character extraction, the display terminal 20b itself can extract character information from video contents such as television broadcasting and display the extracted character information with a high resolution without requiring a distribution server. As a result, it is possible to present video contents even on the display terminal 20b having a small screen such as a portable terminal to a user so as to be easy to understand similarly to the display terminals 20 and 20a of the first and second embodiments.

Figure 11:
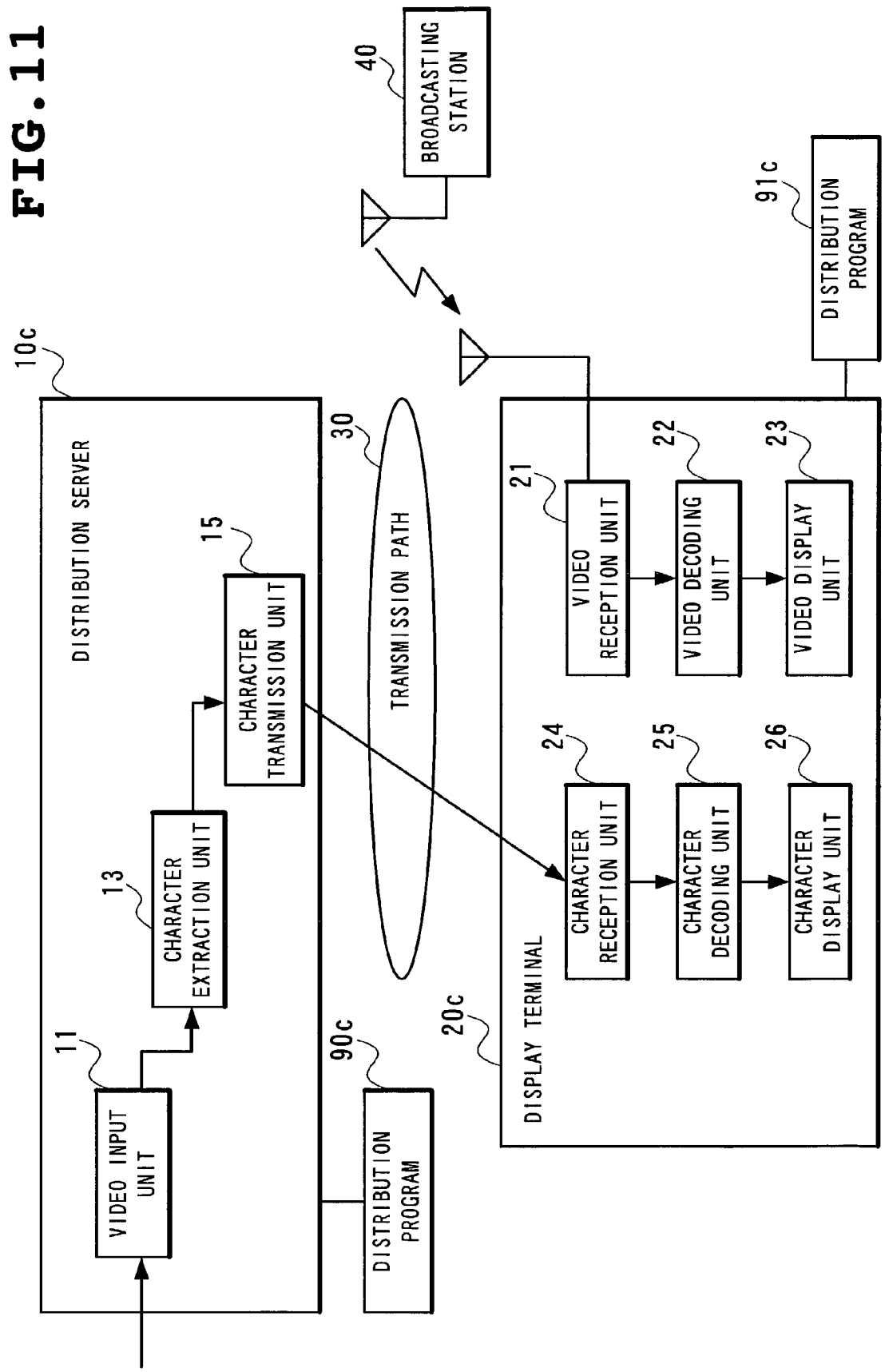
FIG. 11 is a block diagram showing a structure of a contents distribution system according to a fourth embodiment of the present invention.

Next, a fourth embodiment of the present invention will be described. FIG. 11 is a block diagram showing a structure of a contents distribution system according to the fourth embodiment of the present invention.

Although according to the third embodiment, the display terminal 20b directly receives video and also extracts a character region, since a portable apparatus has a low processing capacity in general, it might have difficulty in extracting a character region.

Figure 12:
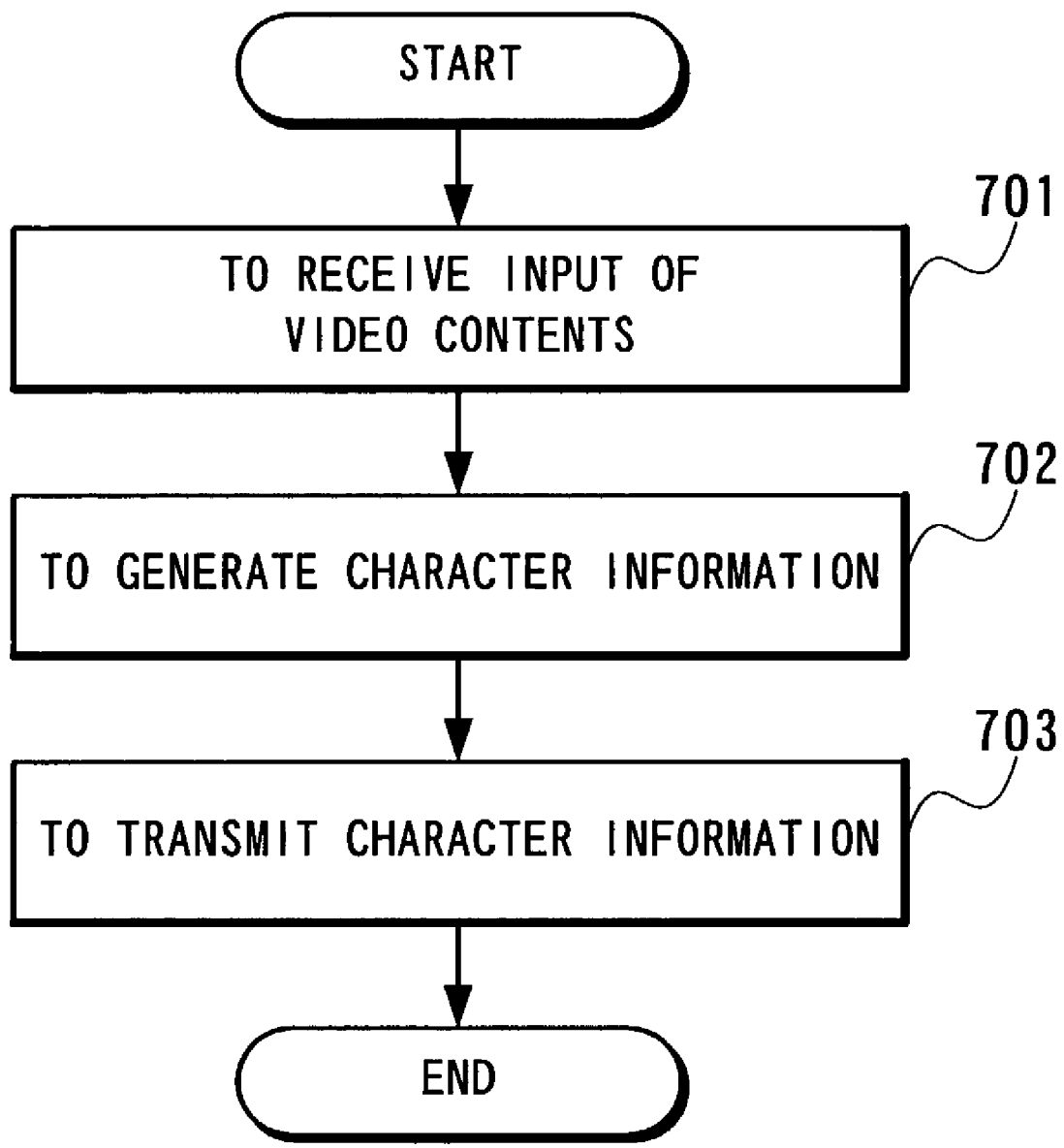
FIG. 12 is a flow chart for use in explaining operation of a distribution server according to the fourth embodiment of the present invention.
Figure 13:
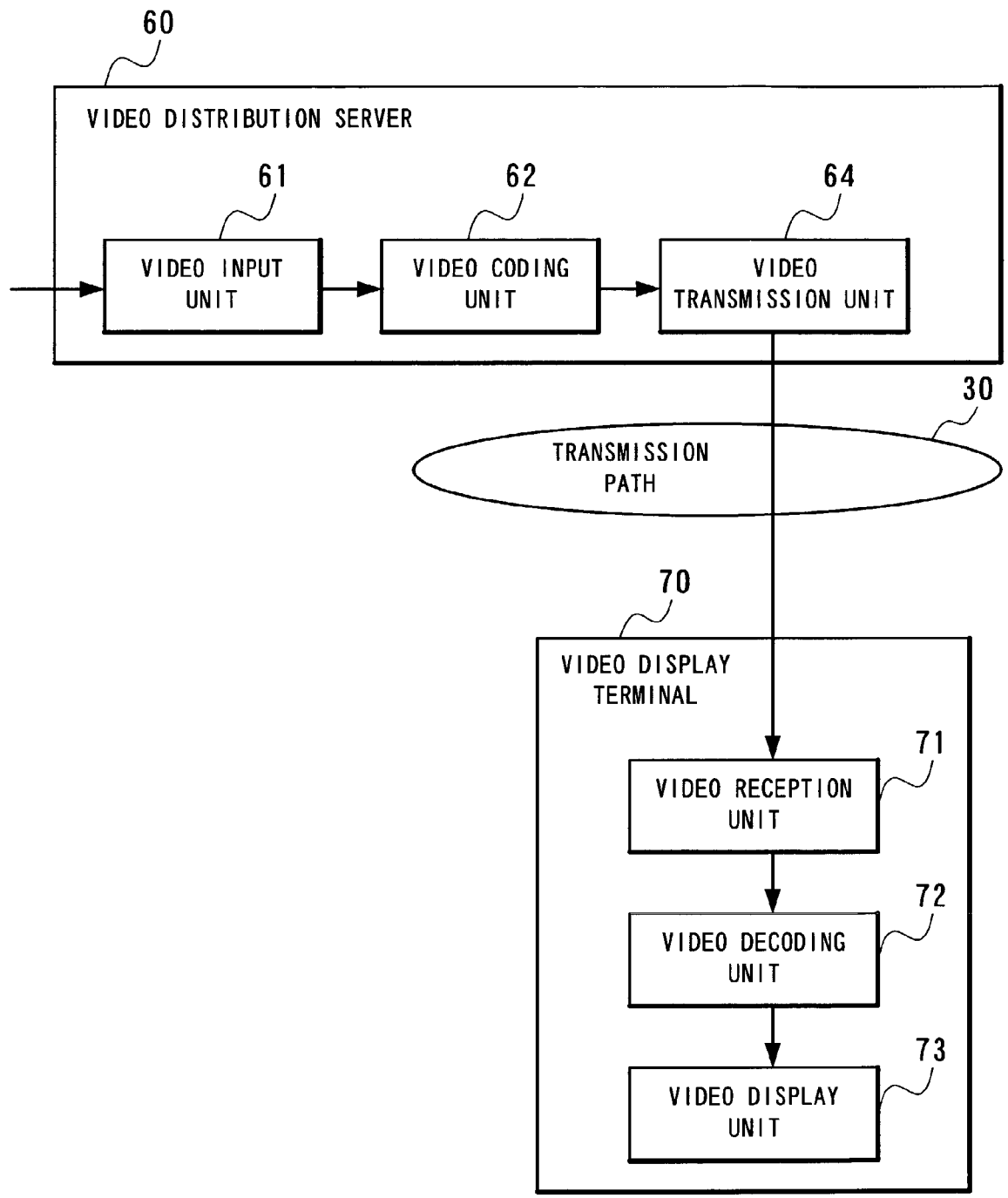
FIG. 13 is a block diagram showing a structure of a conventional video contents distribution system.

FIG. 12 is a flow chart for use in explaining operation of a distribution server 10c.

According to the present embodiment, therefore, the distribution server 10c receives, at the video input unit 11, video contents of the same program as that received by a display terminal 20c from the external broadcasting station 40 (Step 701), extracts its character information by means of the character extraction unit 13 (Step 702) and transmits the character information to the display terminal 20c by means of the character transmission unit 15 (Step 703). The display terminal 20c, similarly to the first and the second embodiments, receives, at the character reception unit 24, character information distributed from the distribution server 10c, conducts necessary decoding processing at the character decoding unit 25 and displays the character information by means of the character display unit 26.

On the other hand, similarly to the third embodiment, video contents are received from other unit such as the broadcasting station 40 or the like than the distribution server 10c by means of the video reception unit 21, subjected to necessary decoding processing by the video decoding unit 22 and displayed by the video display unit 23.

The method of displaying character information by the display terminal 20c according to the present embodiment can be executed by the same manner as those of the above-described first and second embodiments.

As described in the foregoing, the present embodiment enables, in addition to the effect attained by the third embodiment, even the display terminal 20c having difficulty in conducting processing of extracting a character region to display character information. In addition, by distributing only character information by the distribution server 10c and receiving video contents by the display terminal 20c from other unit such as the broadcasting station 40, the same effects attained by the contents distribution systems according to the first and the second embodiments can be realized.

Moreover, by receiving video information whose volume of data is in general large by directly using radio wave without receiving the video from the distribution server 10c, costs for data communication can be suppressed to distribute character information more efficiently than by the first and the second embodiments.

Although each of the above-described embodiments employs a system in which each of the display terminals 20, 20a, 20b and 20c simultaneously displays video contents and its character information, the terminal may display only character information and not video contents. As a result, character information of video contents can be displayed with less volume of communication.

In the contents distribution systems according to the above-described embodiments, the functions of the video input unit 11, the video coding unit 12, the character extraction unit 13, the video transmission unit 14, the character transmission unit 15, the multiplexing unit 16 and the transmission unit 17 in each of the distribution servers 10, 10a and 10c, the functions of the video reception unit 21, the video decoding unit 22, the video display unit 23, the character reception unit 24, the character decoding unit 25, the character display unit 26, the reception unit 27, the demultiplexing unit 28 and the character extraction unit 29 in each of the display terminals 20, 20a, 20b and 20c, and other functions can be realized not only by hardware but also by loading contents distribution programs 90, 90a, 90c, 91, 91a, 91b and 91c as computer programs having the respective functions into a memory of a computer processing device. The contents distribution programs 90, 90a, 90c, 91, 91a, 91b and 91c are stored in a recording medium such a magnetic disc or a semiconductor memory. Then, loading the programs from the recording medium into the computer processing device to control operation of the computer processing device realizes each of the above-described functions.

Although the present invention has been described with respect to the preferred modes and embodiments in the foregoing, the present invention is not necessarily limited to the above-described modes ad embodiments and can be implemented in variation within a scope of its technical idea.

As described in the foregoing, the present invention enables even video contents distributed at a low bit rate to be presented to a user so as to be easy to understand by extracting character information from the video contents at a distribution server and, independently of the video contents, distributing the same as text data or as an image coded by using high-quality coding method.

Therefore, a display terminal requires no capability of processing character extraction and even a display terminal having a narrow display screen such as a portable communication terminal is allowed to display characters in video contents clearly and present the contents of the video contents to be easy to understand to a user.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A contents distribution system for distributing contents from a distribution server to a display terminal, wherein
said distribution server detects a region in which a character is displayed from an image of video contents, generates character information for use in confirming said character displayed in said region detected and distributes said character information generated to said display terminal at a low bit rate,
wherein said distribution server distributes said video contents to said display terminal simultaneously with the character information of said video contents, and
said display terminal presents the character information of said video contents received from said distribution server together with said video contents received simultaneously,
wherein the character information obtained from the image of video contents is encoded at a higher resolution than non-character information of the image of video contents prior to being sent by said distribution server to said display terminal,
wherein said distribution server transmits character subsidiary information including position information of said region detected to the display terminal, accepts designation of said region from said display terminal, generates alternatively an image of designated region having high resolution or character code obtained by character read from said designated region, and distributes said image of said designated region or said character code as the character information to the display terminal.

2. The contents distribution system as set forth in claim 1, wherein
said distribution server generates an image of said region detected as the character information of said video contents,
wherein the character information is provided to said display terminal from said distribution server by way of a packet switching, and
wherein the non-character information of the image of video contents is provided to said display terminal from said distribution server by way of a circuit switching.

3. The contents distribution system as set forth in claim 1, wherein
said distribution server generates text data of the character displayed in said region detected as the character information of said video contents by character read.

4. The contents distribution system as set forth in claim 1, wherein
when a plurality of regions in which characters are displayed are detected from the image of said video contents, said distribution server accepts designation of said region from said display terminal and distributes said character information generated from said region designated to said display terminal.

5. The contents distribution system as set forth in claim 1, wherein
said distribution server multiplexes the character information of said video contents and said video contents and distributes the multiplexed contents to said display terminal.

6. The contents distribution system as set forth in claim 1, wherein
said display terminal receives, from said distribution server, character information of said video contents received from an external broadcasting station and presents the character information of said video contents together with said video contents.

7. The contents distribution system as set forth in claim 1, wherein
the character information of said video contents includes character subsidiary information indicative of features of the character displayed in the image of said video contents, and
said display terminal presents the character information of said video contents received from said distribution server based on said character subsidiary information included in said character information.

8. The contents distribution system as set forth in claim 7, wherein
the character subsidiary information of said video contents includes information about a position, in the image of said video contents, of said region detected from said image.

9. The contents distribution system as set forth in claim 7, wherein
the character subsidiary information of said video contents includes information about a layout structure of the character displayed in the image of said video contents.

10. A distribution server for distributing contents to a display terminal, comprising:
means for detecting a region in which a character is displayed from an image of video contents;
means for generating character information for use in confirming said character displayed in said region detected;
means for distributing said character information generated to said display terminal; and
means for distributing said video contents to said display terminal simultaneously with the character information of said video contents,
wherein the character information obtained from the image of video contents is encoded at a higher resolution than non-character information of the image of video contents prior to being sent by said distribution server to said display terminal,
wherein said character information distributing means transmits character subsidiary information including position information of said region detected to the display terminal, accepts designation of said region from said display terminal, generates alternatively an image of designated region having high resolution or character code obtained by character read from said designated region, and distributes said image of said designated region or said character code as the character information to the display terminal, and
wherein the contents are distributed to said display terminal at a low bit rate.

11. The server as set forth in claim 10, further comprising:
means for, when a plurality of regions in which characters are displayed are detected from the image of said video contents, accepting designation of said region from said display terminal,
thereby distributing said character information generated in said region designated to said display terminal,
wherein the character information is provided to said display terminal from said distribution server by way of a packet switching, and
wherein the non-character information of the image of video contents is provided to said display terminal from said distribution server by way of a circuit switching.

12. The server as set forth in claim 10, further comprising means for multiplexing the character information of said video contents and said video contents and distributing the multiplexed contents to said display terminal.

13. The server as set forth in claim 10, further comprising:
means for generating an image of said region detected as the character information of said video contents, and
means for reducing the size of an image of said video contents to be distributed to said display terminal to a designated size,
thereby distributing said image generated as said character information with quality higher than the quality of said video contents whose image size is reduced to said display terminal together with said video contents reduced.

14. The server as set forth in claim 10, further comprising means for generating an image of said region detected as the character information of said video contents.

15. The server as set forth in claim 10, further comprising means for generating an image obtained by making said region detected into a binary image as the character information of said video contents.

16. The server as set forth in claim 10, further comprising means for generating text data of the character displayed in said region detected as the character information of said video contents by character read.

17. The server as set forth in claim 10, further comprising:
means for obtaining text data of the character displayed in said region detected by character read, and
means for generating a translation which is obtained by translating said text data obtained by said character read into a designated language as the character information of said video contents.

18. The server as set forth in claim 10, further comprising:
means for identifying features of a character displayed in the image of said video contents,
thereby distributing, as character subsidiary information, information about features of said character identified so as to be included in the character information of said video contents to said display terminal.

19. The server as set forth in claim 10, further comprising:
means for recording said video contents and the character information of said video contents, and
means responsive to a request from said display terminal for distributing said video contents and the character information of said video contents requested to said display terminal.

20. A non-transitory computer readable medium storing a contents distribution program for distributing contents to a display terminal by controlling a computer, comprising the functions of:
detecting a region in which a character is displayed from an image of video contents;
generating character information for use in confirming said character displayed in said region detected;
distributing said character information generated to said display terminal together with said video contents; and
distributing said video contents to said display terminal simultaneously with said character information of said video contents, wherein the character information obtained from the image of video contents is encoded at a higher resolution than non-character information of the image of video contents prior to being sent by said distribution server to said display terminal, wherein said distributing function comprises transmitting character subsidiary information including position information of said region detected to said display terminal, accepting designation of said region from said display terminal, generating alternatively an image of designated region having high resolution or character code obtained by character read from said designated region, and distributing said image of said designated region or said character code as the character information to said display terminal, and wherein the contents are distributed to said display terminal at a low bit rate.

21. The contents distribution system as set forth in claim 1, wherein the character information of said video contents received from said distribution server is displayed independently of said video contents received simultaneously by said display terminal.

22. The server as set forth in claim 10, wherein the character information of said video contents received from said distribution server is displayed independently of said video contents received simultaneously by said display terminal.

23. The non-transitory computer readable medium as set forth in claim 20, wherein the character information of said video contents received from said distribution server is displayed independently of said video contents received simultaneously by said display terminal.

* * * * *